(12) United States Patent
Dwarkaprasad et al.

(10) Patent No.: US 10,938,811 B2
(45) Date of Patent: Mar. 2, 2021

(54) ELECTRONIC APPARATUS TO PROCESS REQUEST FOR HAVING ACCESS TO HOST APPARATUS, CONTROL METHOD THEREOF, AND SYSTEM

(71) Applicant: Samsung Electronics Co., Ltd., Suwon-si (KR)

(72) Inventors: Dayama Dwarkaprasad, Seoul (KR); Sharma Abhishek, Bengaluru (IN); Mahsky Hemant Kumar, Bangalore (IN); Mullick Vikalp, Jabalpur (IN); Lanka Madan Kanth, Bengaluru (IN); Channa Ashok Babu, K R Puram (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 15/989,617

(22) Filed: May 25, 2018

(65) Prior Publication Data

US 2018/0359248 A1     Dec. 13, 2018

(30) Foreign Application Priority Data

Jun. 12, 2017   (KR) .................... 10-2017-0073072

(51) Int. Cl.
| | |
|---|---|
| *H04L 29/06* | (2006.01) |
| *G06F 21/31* | (2013.01) |
| *G06F 16/955* | (2019.01) |

(52) U.S. Cl.
CPC ........ *H04L 63/0876* (2013.01); *G06F 16/955* (2019.01); *G06F 21/31* (2013.01); *H04L 63/104* (2013.01)

(58) Field of Classification Search
CPC ........................... H04L 63/0876; G06F 21/31
See application file for complete search history.

(56) References Cited

U.S. PATENT DOCUMENTS

| | | | |
|---|---|---|---|
| 7,809,812 B2 | 10/2010 | Doumuki | |
| 10,547,613 B1* | 1/2020 | Roths | ................. H04L 63/0823 |
| 2002/0082861 A1* | 6/2002 | Takata | ................... G06Q 20/20 |
| | | | 705/16 |
| 2004/0249961 A1* | 12/2004 | Katsube | ................. H04L 63/08 |
| | | | 709/229 |
| 2005/0201393 A1* | 9/2005 | Hatayama | ........... H04L 12/2807 |
| | | | 370/401 |
| 2008/0313448 A1 | 12/2008 | Doumuki | |

(Continued)

FOREIGN PATENT DOCUMENTS

KR    10-2010-0047077 A    5/2010

*Primary Examiner* — Jason Chiang
(74) *Attorney, Agent, or Firm* — Jefferson IP Law, LLP

(57) ABSTRACT

An electronic apparatus is provided. The electronic apparatus includes a communicator configured to communicate with a host apparatus and an external apparatus, and a processor configured to receive a request including an ID of the external apparatus from the external apparatus, the request for having an access to the host apparatus, determine whether the external apparatus is authenticated based on the ID of the external apparatus, and process the external apparatus to access the host apparatus based on secure access information by transmitting the secure access information to the external apparatus when it is determined that the external apparatus is authenticated.

15 Claims, 9 Drawing Sheets

(56) References Cited

U.S. PATENT DOCUMENTS

| | | | |
|---|---|---|---|
| 2009/0077636 A1* | 3/2009 | Duffie, III | G06F 21/335 |
| | | | 726/5 |
| 2009/0197571 A1* | 8/2009 | Kitajima | H04W 12/06 |
| | | | 455/411 |
| 2010/0251352 A1* | 9/2010 | Zarchy | G06F 21/10 |
| | | | 726/9 |
| 2011/0086616 A1* | 4/2011 | Brand | G06Q 20/42 |
| | | | 455/411 |
| 2013/0081114 A1* | 3/2013 | Bell | H04L 63/0846 |
| | | | 726/5 |
| 2016/0188396 A1 | 6/2016 | Sonalker et al. | |
| 2017/0099294 A1* | 4/2017 | Roberts | H04L 63/10 |
| 2017/0289120 A1* | 10/2017 | Kohli | H04L 63/08 |
| 2018/0124068 A1* | 5/2018 | Ruhlen | H04L 67/02 |

\* cited by examiner

ELECTRONIC APPARATUS TO PROCESS REQUEST FOR HAVING ACCESS TO HOST APPARATUS, CONTROL METHOD THEREOF, AND SYSTEM

CROSS-REFERENCE TO RELATED THE APPLICATION(S)

This application is based on and claims priority under 35 U.S.C. § 119 of a Korean patent application number 10-2017-0073072, filed on Jun. 12, 2017, in the Korean Intellectual Property Office, the disclosure of which is incorporated by reference herein in its entirety.

BACKGROUND

1. Field

The disclosure relates to an electronic apparatus, which supports a preset wireless communication protocol and has an access to various kinds of communication networks, a control method thereof, and a system. More particularly, the disclosure relates to an electronic apparatus which makes an external apparatus newly purchased by a user have an access to and communicate with a unit network that has been secured, a control method thereof, and a system.

2. Description of the Related Art

To compute and process predetermined information in accordance with certain processes, an electronic apparatus basically includes a central processing unit (CPU), a chipset, a memory, and the like electronic components for computation. Such an electronic apparatus may be variously classified in accordance with what information will be processed or what purpose it is used for. For example, the electronic apparatus is classified into an information processing apparatus such as a personal computer (PC), a server or the like for processing general information, an image processing apparatus for processing video information, an audio apparatus for processing audio information, a household appliances for doing household chores, etc.

Like a plurality of various electronic apparatuses present in the home, for example, a TV, a refrigerator, a washing machine, a mobile device, etc., the electronic apparatuses have been grafted onto a users' daily lives. With an increasing demand level of a user and corresponding development in performance of the electronic apparatuses, the plurality of electronic apparatuses have been changed to not only operate independently of one another but also interwork with one another. Such an interworking operation is based on communication between the plurality of electronic apparatuses. In particular, when a mobile device is taken into account, wireless communication is used. However, direct wireless communication between the plurality of electronic apparatuses may cause a security risk. Therefore, in terms of security, it is preferable that communication is allowed for only the plurality of electronic apparatuses registered to one unit network system using a preset security protocol.

The unit network supports Internet of things (TOT) like a home network. For example, a user may use a predetermined mobile device to control operations of a TV or household appliances, adjust a temperature of a boiler, release a door lock, or turn on a light. However, if these operations are possible through an unspecified mobile device, it becomes a problem. In other words, the foregoing operations are allowed for only the mobile device registered to the unit network, but banned for an unregistered mobile device. Accordingly, a user has conventionally had to register an electronic apparatus such as a mobile device or the like newly purchased by him/her to the unit network before using the electronic apparatus on the unit network.

However, conventional procedures for registering the electronic apparatus are not easy for every user. In other words, it may be difficult for some users to perform these registration procedures. Further, when there is a plurality of electronic apparatuses newly purchased a user, it is cumbersome since all the electronic apparatuses have to undergo the registration procedures. Accordingly, when the electronic apparatus is registered to the secured unit network, there is a need of easily registering the electronic apparatus while maintaining the security.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus including, a communicator configured to communicate with a host apparatus and an external apparatus, and a processor configured to receive a request including an ID of the external apparatus from the external apparatus, the request for providing access to the host apparatus, determine whether the external apparatus is authenticated based on the ID of the external apparatus, and process the request for the external apparatus to access the host apparatus based on secure access information by transmitting the secure access information to the external apparatus when it is determined that the external apparatus is authenticated. Thus, the electronic apparatus provides an environment where the external apparatus can provide access to the host apparatus, without a user's cumbersome input procedures using the external apparatus.

The processor may be accessible to a database in which an ID of a user is stored corresponding to IDs of one or more external apparatuses, and may determine that the external apparatus is authenticated when the ID of the external apparatus matching with the user ID of the electronic apparatus is retrieved in the database.

The database may be stored in a server, and the processor may transmit the user ID of the electronic apparatus and the ID of the external apparatus to the server through the communicator, and may determine whether the external apparatus is authenticated or not in accordance with retrieval results received from the server.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a storage configured to store the user ID of the electronic apparatus, wherein the processor may receive the retrieval result from the server by transmitting the user ID of the electronic apparatus stored in the storage together with the ID of the external apparatus to the server in response to the request.

In accordance with another aspect of the disclosure, an electronic apparatus is provided. The electronic apparatus includes a storage configured to store the database, wherein the processor may determine whether the external apparatus is authenticated or not in accordance with retrieval results of the database stored in the storage.

In accordance with another aspect of the disclosure, an electronic apparatus is provided. The electronic apparatus includes a display, wherein the processor may process the display to display a user interface (UI) for receiving an input of the user ID in response to the request, and may acquire the user ID of the electronic apparatus based on the input to the UI.

The secure access information may include at least one of network information and password information set in the host apparatus to provide access to the host apparatus.

The processor may call previously generated first authentication information based on the ID of the external apparatus and the user ID used in purchasing the external apparatus, may generate second authentication information based on the ID of the external apparatus acquired from the request and the user ID of the electronic apparatus acquired in response to the request, and may determine that the external apparatus is authenticated when the second authentication information is identical to the first authentication information.

In accordance with another aspect of the disclosure, a method for controlling an electronic apparatus is provided. The method includes receiving a request for providing access to a host apparatus together with an ID of an external apparatus from the external apparatus, determining whether the external apparatus is authenticated or not based on the ID of the external apparatus acquired from the request, and processing the request for the external apparatus to access the host apparatus based on secure access information by transmitting the secure access information to the external apparatus when it is determined that the external apparatus is authenticated.

The determining includes accessing a database in which an ID of a user is stored corresponding to IDs of one or more external apparatuses, and determining that the external apparatus is authenticated when the ID of the external apparatus matching with the user ID of the electronic apparatus is retrieved in the database.

The database may be stored in a server, and the determining includes transmitting the user ID of the electronic apparatus and the ID of the external apparatus to the server, and determining whether the external apparatus is authenticated or not in accordance with retrieval results received from the server.

The determining includes receiving the retrieval result from the server by transmitting the user ID of the electronic apparatus stored in the electronic apparatus together with the ID of the external apparatus to the server in response to the request.

The determining includes determining whether the external apparatus is authenticated or not in accordance with retrieval results of the database stored in the electronic apparatus.

The determining includes displaying a UI for receiving an input of the user ID in response to the request, and acquiring the user ID of the electronic apparatus based on the input to the UI.

The secure access information includes at least one of network information and password information set in the host apparatus to provide access to the host apparatus.

The determining includes calling previously generated first authentication information based on the ID of the external apparatus and the user ID used in purchasing the external apparatus, generating second authentication information based on the ID of the external apparatus acquired from the request and the user ID of the electronic apparatus acquired in response to the request, and determining that the external apparatus is authenticated when the second authentication information is identical to the first authentication information.

In accordance with another aspect of the disclosure, a system is provided. The system includes a host apparatus, and an electronic apparatus configured to communicate with the host apparatus, the electronic apparatus includes a communicator configured to communicate with the host apparatus and an external apparatus, and a processor configured to determine whether the external apparatus is authenticated based on an ID of the external apparatus when a request for providing access to the host apparatus is received together with the ID of the external apparatus from the external apparatus, and processes the request for the external apparatus to access the host apparatus based on secure access information by transmitting the secure access information to the external apparatus when it is determined that the external apparatus is authenticated.

Before undertaking the DETAILED DESCRIPTION below, it may be advantageous to set forth definitions of certain words and phrases used throughout this patent document the terms "include" and "comprise," as well as derivatives thereof, mean inclusion without limitation, the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Figure 1:
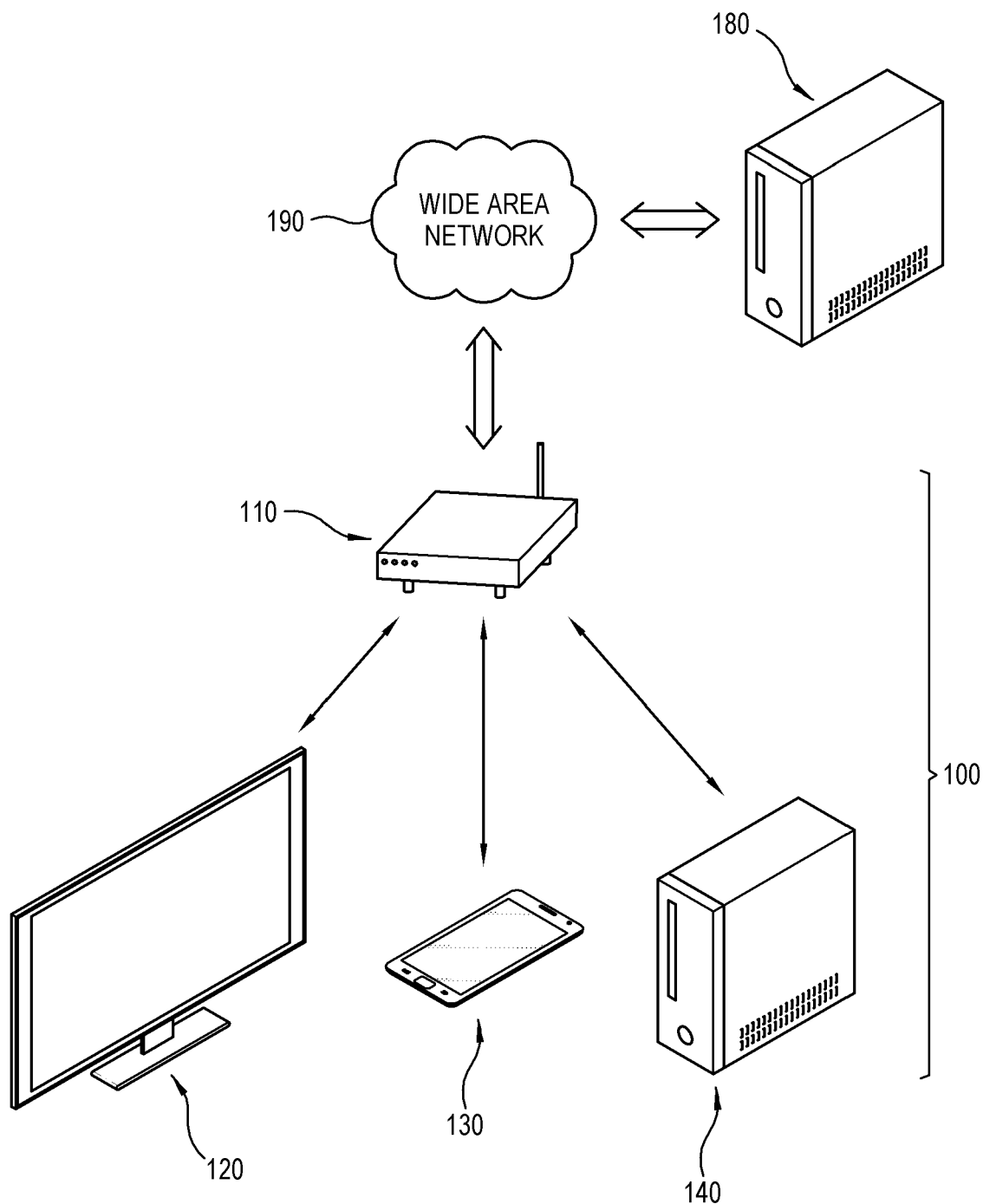
FIG. 1 is a view showing an example of a unit network system according to an embodiment of the disclosure.

FIG. 1 is a view showing an example of a unit network system according to an embodiment of the disclosure.

Referring to FIG. 1, a system 100 according to the disclosure includes one or more host apparatuses 110 and one or more electronic apparatuses 120, 130 and 140 while establishing a unit network. The system 100 in this embodiment includes one host apparatus 110 and a plurality of electronic apparatuses 120, 130 and 140. However, there are no limits to the number of host apparatuses 110 or the number of electronic apparatuses 120, 130 and 140. The unit network system 100 may be materialized by a closed network that adopts a preset security policy to selectively block other external apparatuses from having an access, and may access a wide area network 190 and communicate with a server 180 through the wide area network 190. As an example of the system 100, there is a home network or a local network at home or office.

When the system 100 is materialized by the closed network, its operations will be described below. That the closed network is used as the unit network means that only the electronic apparatuses 120, 130 and 140 authenticated in the system 100 are authorized to have an access to the host apparatus 110 for relaying a communication in the system 100. For example, when the electronic apparatuses 120, 130 and 140 are going to access the wide area network 190 via the host apparatus 110, the electronic apparatuses 120, 130 and 140 have to pass security authentication set in the host apparatus 110. When the host apparatus 110 is materialized as an access point (AP), the host apparatus 110 stores service set identifier (SSID) and a password. The electronic apparatuses 120, 130 and 140 searches the host apparatus for the SSID and transmits the password to the host apparatus 110 so as to be authorized to have an access to the host apparatus 110.

The host apparatus 110 may be materialized by not only the AP but also various communication apparatuses capable of relaying a communication like a gateway, a router, an Internet-of-things (IoT) hub, etc. Further, authentication information for accessing the host apparatus 110 includes various pieces of network information and ID information such as an apparatus ID of the host apparatus 110, a communication ID of the host apparatus 110, and a password authorized to have an access to the host apparatus 110, etc.

When the electronic apparatuses 120, 130 and 140 do not have the authentication information for accessing the host apparatus 110, the electronic apparatuses 120, 130 and 140 cannot have an access to the host apparatus 110. Therefore, a user has conventionally had to manually input the authentication information to each of the electronic apparatuses 120, 130 and 140 in the system 100. However, in the conventional case, it may be difficult to manually input the authentication information according to users since he or she is likely to forget the authentication information or because authentication procedures are complicated. Further, if there are many electronic apparatuses 120, 130 and 140 in the system 100, it is cumbersome for a user to input the authentication information to all the electronic apparatuses 120, 130 and 140.

If the host apparatus 110 is set to accept the access without the authentication information in consideration of a user's inconvenience in inputting the authentication information to the electronic apparatuses 120, 130 and 140, a security risk may arise. For example, descriptions will be made on the premise that the system 100 is the home network and the electronic apparatuses 130 is used to control temperature of a boiler in the system 100. The temperature control of the boiler is directly related to safety of people in home, and therefore the electronic apparatuses 130 of only an authorized person is permitted to have an access to the host apparatus 110. If a third party placed within a range, in which communication with the host apparatus 110 is possible, can have an access to the host apparatus 110 without permission, this poses a serious threat. Accordingly, in terms of security, it is important that the system 100 authorizes the electronic apparatuses 120, 130 and 140 to have an access to the host apparatus 110.

However, in the conventional cases as described above, it may be inconvenient for a user to make the electronic apparatuses 120, 130 and 140 be authenticated in the system 100. Thus, based on ease of use, there is a need of authenticating the electronic apparatuses 120, 130 and 140 more easily while maintaining the security. To this end, descriptions will be made according to an embodiment of the disclosure.

Figure 2:
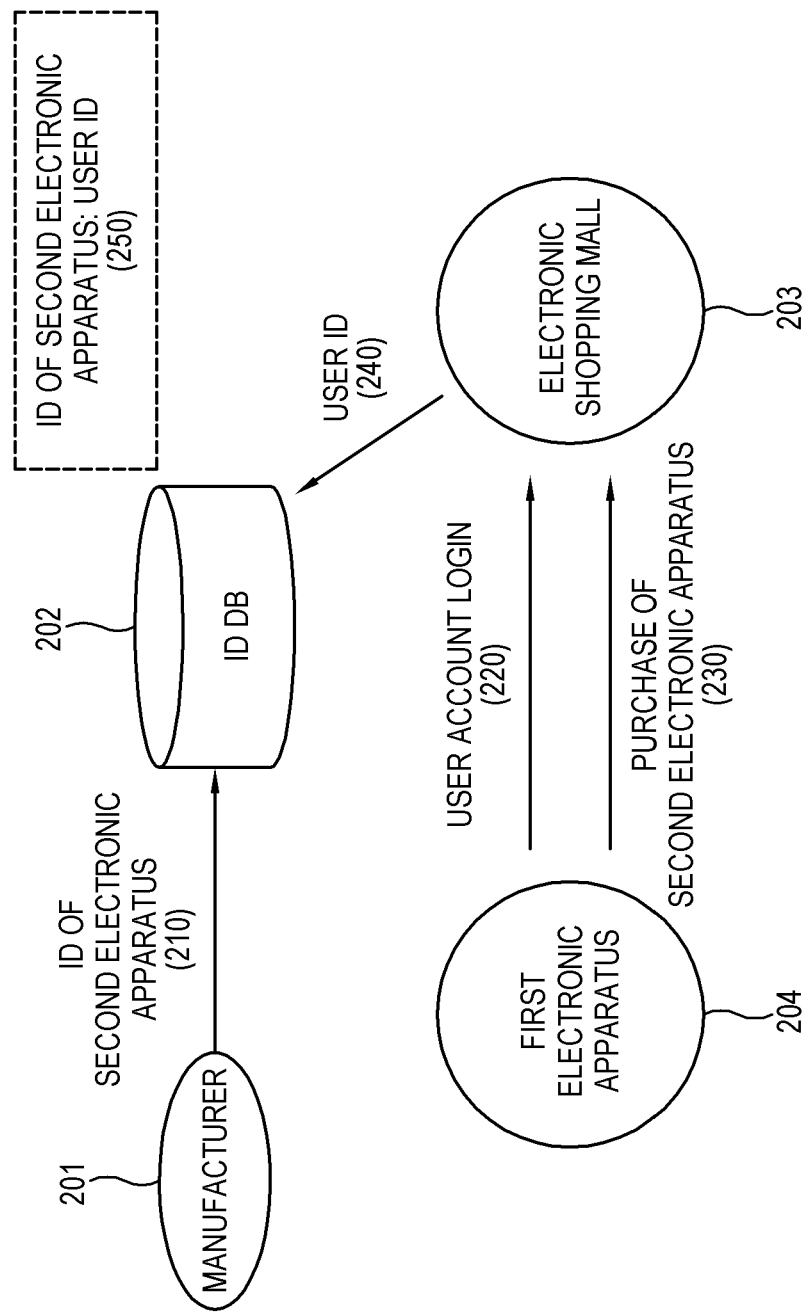
FIG. 2 is a view showing an example of a method of managing ID when a user uses a first electronic apparatus to purchase a second electronic apparatus under a system according to an embodiment of the disclosure.

FIG. 2 is a view showing an example of a method of managing ID when a user uses a first electronic apparatus to purchase a second electronic apparatus under the system according to an embodiment of the disclosure.

Referring to FIG. 2, according to this embodiment of the disclosure, there is provided an electronic shopping environment where a user can make a purchase of an electronic apparatus. The electronic shopping environment includes an ID database (DB) 202 to be managed by a manufacturer 201 of manufacturing the electronic apparatus, an electronic shopping mall 203 selling the electronic apparatus manufactured by the manufacturer 201, and a first electronic apparatus 204 to be controlled by a user to purchase the electronic apparatus from the electronic shopping mall 203.

The electronic apparatus to be controlled by a user will be called the first electronic apparatus 204, and the electronic apparatus purchased by the user from the electronic shopping mall 203 through the first electronic apparatus 204 will be called a second electronic apparatus. Further, the ID DB 202 is stored in a server managed by the manufacturer 201. The electronic shopping mall 203 is run by the server managed by a seller of the second electronic apparatus.

First, at operation 210, the manufacturer 201 registers an ID of the second electronic apparatus to the ID DB 202. There are no limits to the kind and content of ID for the second electronic apparatus as long as it is information for identifying the second electronic apparatus in units of the apparatus. For example, the ID of the second electronic apparatus may include an apparatus ID of the second electronic apparatus, a media access control (MAC) address or the like ID of a wireless communication module provided in the second electronic apparatus, an ID of a central processing unit (CPU) or processor used in the second electronic apparatus, a model number of the second electronic apparatus, etc.

The electronic shopping mall 203 is selling the second electronic apparatus. In this case, the electronic shopping mall 203 has user accounts including the user IDs so as to provide an environment through which a user logs on and specify a user who makes a purchase of the second electronic apparatus. The user account may be input by a user through a user interface (UI) environment provided by the electronic shopping mall 203, and include information related to a specific user, such as a user ID, a user name, a contact number, an address, a purchase history, etc.

At operation 220, the first electronic apparatus 204 logs in with a user account to the electronic shopping mall 203. In this case, the first electronic apparatus 204 transmits the user ID to the electronic shopping mall 203, so that the electronic shopping mall 203 can specify the user of the first electronic apparatus 204.

At operation 230, the first electronic apparatus 204 makes a purchase of the second electronic apparatus provided by the electronic shopping mall 203 in the state that the user account is logged in.

The electronic shopping mall 203 delivers the second electronic apparatus purchased by a user through the first electronic apparatus 204 to the user. In this case, at operation 240, the electronic shopping mall 203 accesses the ID DB 202 and then transmits the ID of the user who purchases the second electronic apparatus to the ID DB 202.

At operation 250 the ID DB 202 is stored and updated with the user ID received from the electronic shopping mall 203 by matching with the ID of the second electronic apparatus. Thus, based on content stored in the ID DB 202, it is possible to specify who has purchased the second electronic apparatus.

In brief, the ID DB 202 stores only the ID of the second electronic apparatus before purchasing the second electronic apparatus, but stores the ID of the user, who has made the purchase, by matching with the ID of the second electronic apparatus after purchasing the second electronic apparatus.

In this embodiment of the disclosure, a user makes a purchase of the second electronic apparatus through the electronic shopping mall 203, but there are no limits to the purchase. Alternatively, a user may purchase a plurality of electronic apparatuses. For example, a user may purchase the second electronic apparatus and a third electronic apparatus from the electronic shopping mall 203 through the first electronic apparatus 204. In this case, the ID DB 202 stores the user ID matching with each of the ID of the second electronic apparatus and the ID of the third electronic apparatus. In other words, the user ID in the ID DB 202 may match with not only the ID of one electronic apparatus but also the IDs of the plurality of electronic apparatuses.

Figure 3:
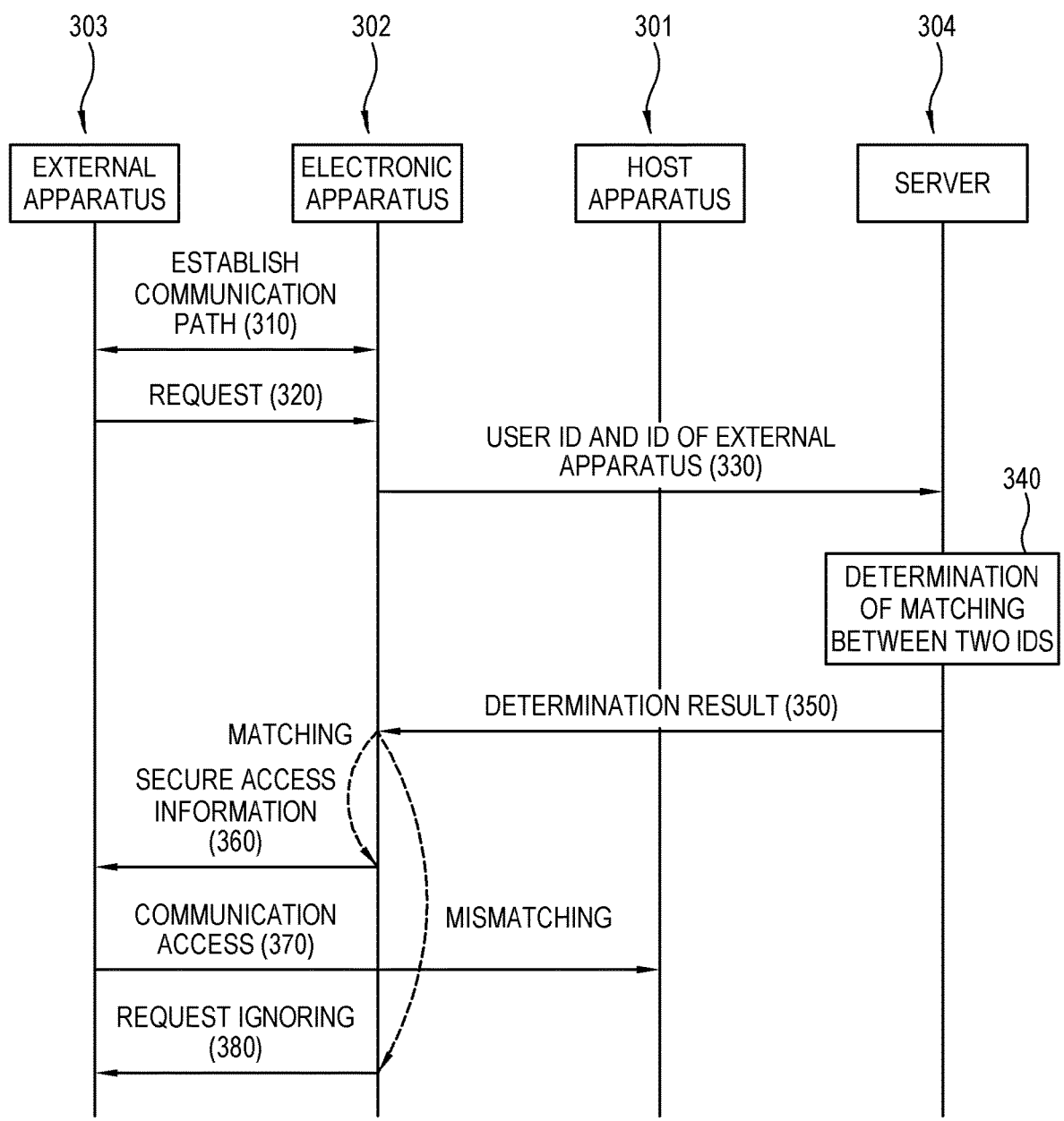
FIG. 3 is a view showing an example of procedures in which an electronic apparatus authorizes an external apparatus to have a communication access to a host apparatus according to an embodiment of the disclosure.

FIG. 3 is a view showing an example of procedures in which an electronic apparatus authorizes an external apparatus to have a communication access to a host apparatus according to an embodiment of the disclosure.

Referring to FIG. 3, in this embodiment of the disclosure, it will be described that an external apparatus 303 newly purchased by a user is added to a unit network system including a host apparatus 301 and an electronic apparatus 302. The newly purchased external apparatus 303 is equivalent to the foregoing second electronic apparatus of FIG. 2.

On the other hand, the electronic apparatus 302 refers to an apparatus that has already been authenticated in the system and accessed the host apparatus 301. The electronic apparatus 302 may be equivalent to or different from the foregoing first electronic apparatus of FIG. 2. For now, descriptions will be made on the premise that the electronic apparatus 302 is equivalent to the foregoing first electronic apparatus of FIG. 2. The case where the electronic apparatus 302 is different from the foregoing first electronic apparatus of FIG. 2 will be described later.

The electronic apparatus 302 communicates with the server 304 on the wide area network. The electronic apparatus 302 may access the server 304 through the host apparatus 301, or may access the server 304 through another path without using the host apparatus 301. The server 304 is equivalent to the foregoing apparatus of FIG. 2 that provides the ID DB.

The system in this embodiment of the disclosure includes a plurality of apparatuses such as the electronic apparatus 302, and the host apparatus 301 is needed for relaying a communication between two apparatuses in the system. To communicate with one apparatus in the system, a predetermined apparatus needs to have a communication access to the host apparatus 301. Further, to have a communication access to the host apparatus 301, there is a need of preset secure access information. Since an apparatus cannot have the communication access to the host apparatus 301 without secure access information, the system has characteristics of a secure network, a local network and a closed network.

The secure access information includes network information to be used by a predetermined apparatus to have a communication access to the host apparatus 301. The secure access information may for example include at least one among a communication protocol of the host apparatus 301, an apparatus ID for identifying the host apparatus 301 on a network, a network address of the host apparatus 301, and password information previously set in the host apparatus 301 for the sake of communication with the host apparatus 301.

Although the electronic apparatus 302 is capable of accessing the host apparatus 301, the electronic apparatus 302 additionally supports at least one of wired and wireless communication protocols for communication without the host apparatus 301. The wired and wireless communication protocols are for initial communication with the external apparatus 303. For example, the electronic apparatus 302 may support Wi-Fi direct, ZigBee, Bluetooth, USB, public network protocols, etc. for the communication with the external apparatus 303.

As shown in the foregoing embodiment of the disclosure, when a user makes a purchase of an external apparatus through the electronic shopping mall, the electronic shopping mall delivers the external apparatus 303 to a user. When a user receives the external apparatus 303 and turns it on, the following procedures are carried out.

At operation 310, the external apparatus 303 establishes a path of communication with the electronic apparatus 302. In this operation, the external apparatus 303 cannot communicate with the host apparatus 301, and thus the path of the communication with the electronic apparatus 302 does not pass through the host apparatus 301. Such a communication path may be based on one-to-one wireless communication protocol such as Wi-Fi direct, ZigBee, Bluetooth, etc.; other public network protocols; or a cable.

At operation 320, the external apparatus 303 makes a request for having a communication access to the host apparatus 301 to the electronic apparatus 302. This request involves the ID of the external apparatus 303.

At operation 330, the electronic apparatus 302 transmits both the user ID previously stored in the electronic apparatus 302 and the ID of the external apparatus 303 received from the external apparatus 303 to the server 304. The electronic apparatus 302 may use the user ID to log in to the server 304 and then transmit the ID of the external apparatus 303, or may transmit information about the user ID and the ID of the external apparatus 303 to the server 304 without logging in with the user ID. This method is determined in accordance with policies of the server 304 on managing a client.

At operation 340, the server 304 retrieves a previously stored ID DB, and thus determines whether the ID of the external apparatus 303 matches with the user ID. That the ID of the external apparatus 303 matches with the user ID means that a user corresponding to the user ID makes a purchase of the external apparatus 303. When the ID of the external apparatus 303 is present in the ID DB and the user ID matches with the ID of the external apparatus 303, the server 304 determines that the ID of the external apparatus 303 corresponds to the user ID. On the other hand, when the ID of the external apparatus 303 is not present in the ID DB or when the ID of the external apparatus 303 is present but does not match with the user ID, the server 304 determines that the ID of the external apparatus 303 does not correspond to the user ID.

At operation 350, the server 304 transmits a determination result to the electronic apparatus 302.

When the determination result from the server 304 shows that the ID of the external apparatus 303 corresponds to the user ID, at operation 360 the electronic apparatus 302 transmits the previously stored secure access information to the external apparatus 303. Thus, at operation 370 the external apparatus 303 accesses and communicates with the host apparatus 301 based on the secure access information received from the electronic apparatus 302. Thus, the external apparatus 303 is authenticated in the system and performs communication with the host apparatus 301.

On the other hand, when the determination result from the server 304 shows that the ID of the external apparatus 303 does not correspond to the user ID, at operation 380 the electronic apparatus 302 ignores the request from the external apparatus 303. Thus, the external apparatus 303 is not authenticated in the system and thus performs no communication with the host apparatus 301.

The electronic apparatus 302 according to this embodiment of the disclosure determines whether the external apparatus 303 is purchased by a user or not, and selectively transmits the secure access information to the external apparatus 303 in accordance with the determination results, thereby selectively registering or blocking the external apparatus 303 to the system. Thus, the external apparatus 303 is easily authenticated in the system and used by a user without complicated inputs for authenticating the external apparatus 303.

Below, a method of controlling the electronic apparatus 302 according to an embodiment of the disclosure will be schematically described.

Figure 4:
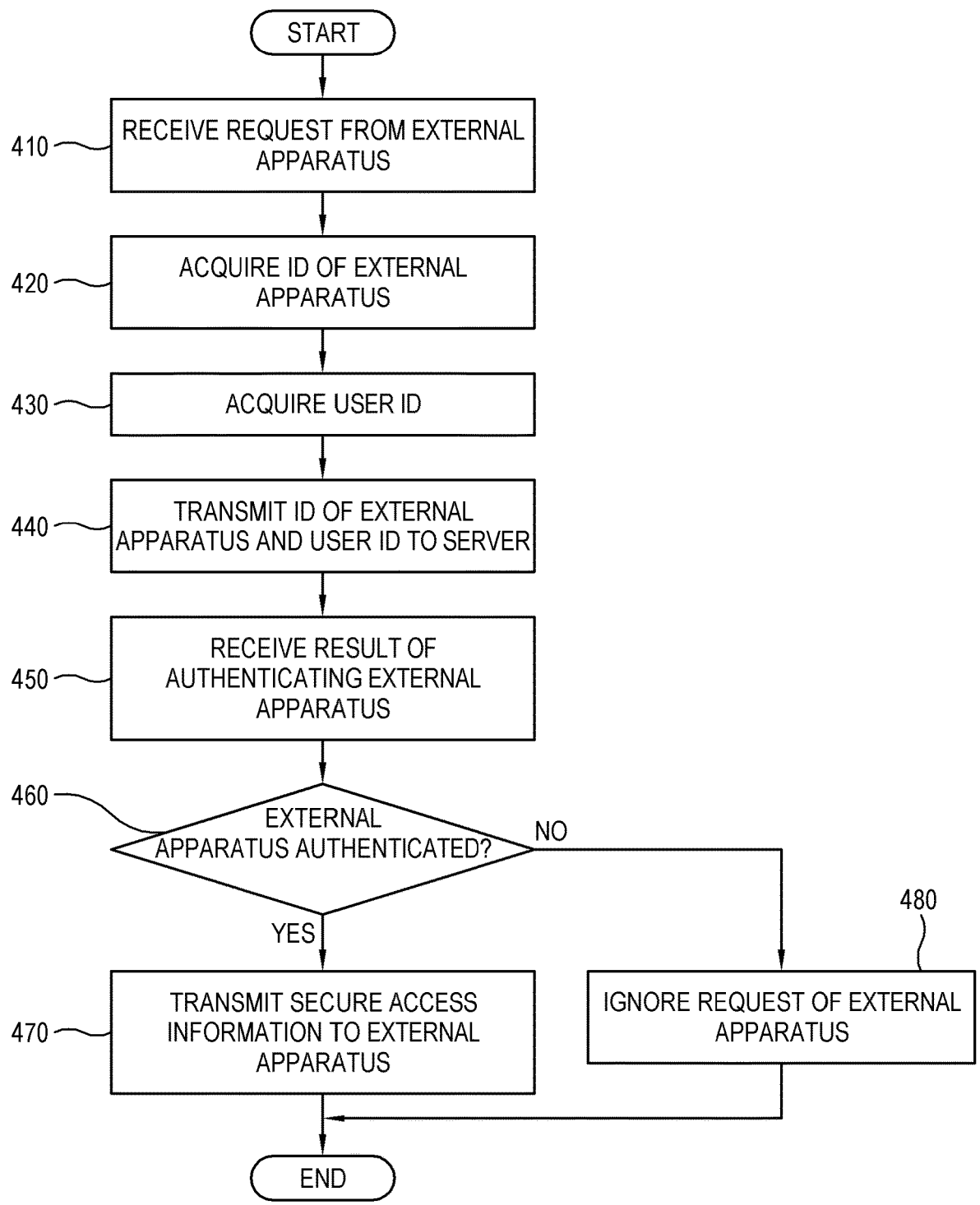
FIG. 4 is a flowchart showing a method of controlling an electronic apparatus according to an embodiment of the disclosure.

FIG. 4 is a flowchart showing a method of controlling an electronic apparatus according to an embodiment of the disclosure.

Referring to FIG. 4, at operation 410 the electronic apparatus receives a request for a communication access to a host apparatus from an external apparatus. Prior to this operation, the electronic apparatus is being connected to the host apparatus or having the communication access to the host apparatus.

At operation 420, the electronic apparatus acquires the ID of the external apparatus from the received request. The ID of the external apparatus refers to information previously stored in the external apparatus, and transmitted together with the request of the external apparatus to the electronic apparatus.

At operation 430, the electronic apparatus acquires user ID. In this embodiment of the disclosure, the user ID is stored in the electronic apparatus, and the electronic apparatus calls the previously stored user ID.

At operation 440, the electronic apparatus transmits the ID of the external apparatus and the user ID to a server. In this case, the electronic apparatus is connected to the server via the host apparatus, or connected to the server in accordance with separate communication protocols without the host apparatus.

At operation 450, the electronic apparatus receives a result of authenticating the external apparatus from the server. The authentication of the external apparatus is performed by the server. The server stored a database (DB) about the ID of the external apparatus, and the ID of the user who purchases the external apparatus. The DB is equivalent to that described in the above embodiment of the disclosure.

At operation 460, the electronic apparatus determines whether the external apparatus is authorized or not based on the authentication results from the server.

When it is determined that the external apparatus is authorized, at operation 470 the electronic apparatus transmits the secure access information to the external apparatus. The secure access information refers to information needed for having a communication access to the host apparatus. In this embodiment of the disclosure, the secure access information is stored in the electronic apparatus. Thus, the external apparatus can have the communication access to the host apparatus based on the secure access information received from the electronic apparatus.

On the other hand, when it is determined that the external apparatus is not authorized, at operation 480 the electronic apparatus ignores the request from the external apparatus and does not transmit the secure access information to the external apparatus. Thus, the external apparatus cannot have the communication access to the host apparatus.

Like this, the electronic apparatus according to the embodiment of the disclosure determines whether the external apparatus is authorized or not based on the ID of the external apparatus when receiving the request for having the communication access to the host apparatus, which involves the ID of the external apparatus, from the external apparatus. When it is determined that the external apparatus is authorized, the electronic apparatus transmits the secure access information to the external apparatus so that the external apparatus can have the communication access to the host apparatus based on the secure access information.

Thus, the electronic apparatus can register the external apparatus to the secured network system without complicated input procedures inconvenient for a user.

In this embodiment of the disclosure, the electronic apparatus playing a key role of authenticating the external apparatus is the same apparatus used in purchasing the external apparatus. However, an apparatus for purchasing the external apparatus may be the same as or different from an apparatus for authenticating the external apparatus.

Further, in this embodiment of the disclosure, the electronic apparatus is previously storing the user ID and the secure access information. However, the electronic apparatus may not store at least one of the user ID and the secure access information. In particular, the electronic apparatus may not store the user ID when it has not been previously used for purchasing the external apparatus. Below, it will be described that the electronic apparatus adds the external apparatus to the system when the electronic apparatus is not storing the user ID.

Figure 5:
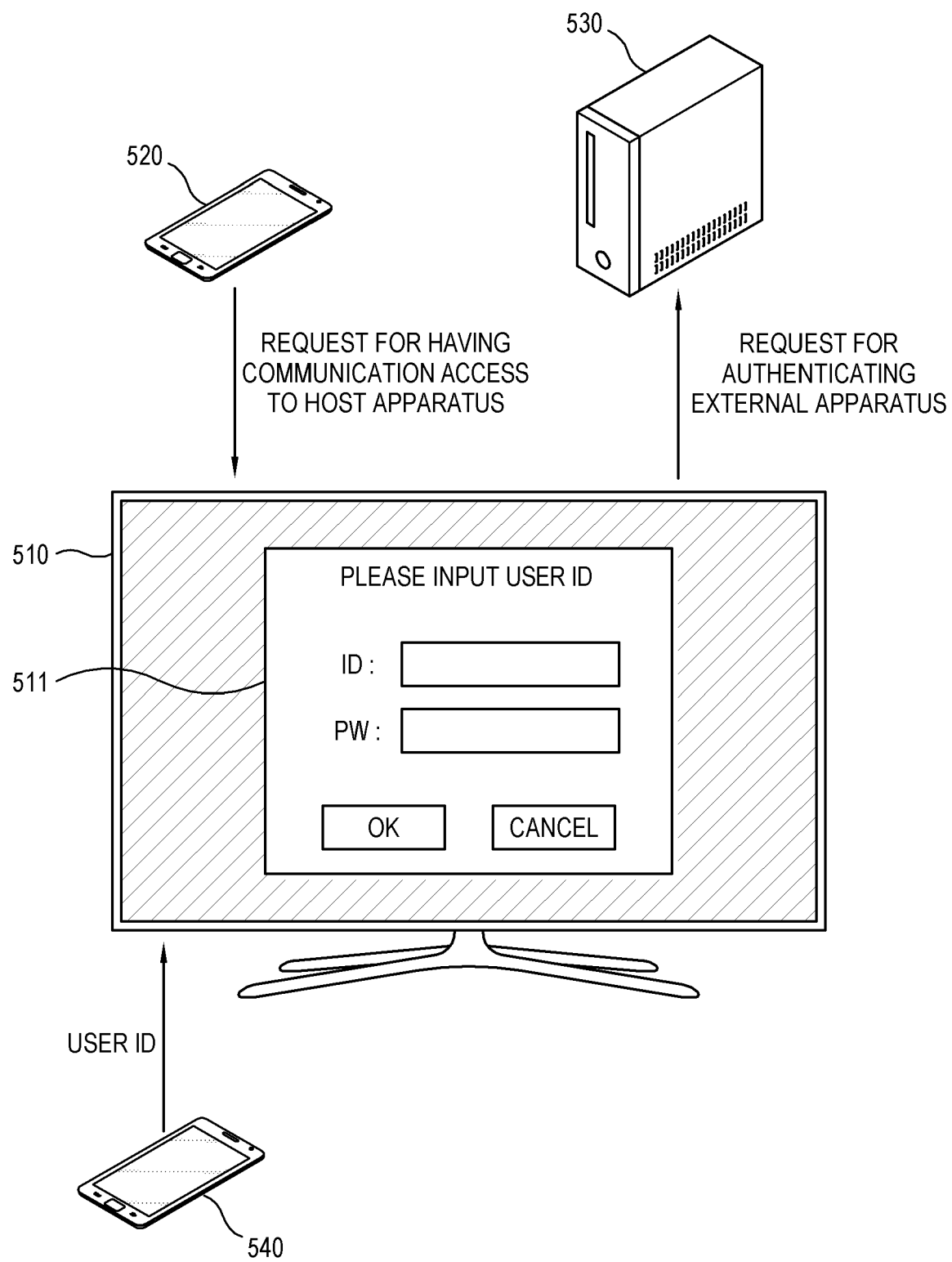
FIG. 5 is a view showing an example of a user interface (UI) displayed when an electronic apparatus is requested to authorize the external apparatus to have a communication access to a host apparatus according to an embodiment of the disclosure.

FIG. 5 is a view showing an example of a UI displayed when an electronic apparatus is requested to authorize the external apparatus to have a communication access to a host apparatus according to an embodiment of the disclosure.

Referring to FIG. 5, an electronic apparatus 510 receives a request for having the communication access to the host apparatus from an external apparatus 520. The electronic apparatus 510 may acquire the ID of the external apparatus 520 from the request of the external apparatus 520. In this case, the external apparatus 520 has to be first authenticated before receiving the secure access information for accessing the host apparatus. The electronic apparatus 510 has to undergo authentication procedures by transmitting the user ID of the electronic apparatus 510 together with the ID of the external apparatus 520 to a server 530.

By the way, in this operation, the electronic apparatus 510 may not be storing the user ID in itself. The reasons why the electronic apparatus 510 is not storing the user ID may be because the electronic apparatus 510 is not used in purchasing the external apparatus 520 or the electronic apparatus 510 does not store the user ID in the purchasing operation even though it is used in purchasing the external apparatus 520. In terms of user security, the electronic apparatus 510 may be set not to store the user ID. In this case, the electronic apparatus 510 needs to acquire the user ID in response to the request from the external apparatus 520. The electronic apparatus 510 may acquire the user ID in various ways.

As one of the ways, the electronic apparatus 510 may display a UI 511 for allowing a user to directly input the user ID. The electronic apparatus 510 displays the UI 511 in response to the request from the external apparatus 520, and transmits the user ID input through the UI 511 together with the ID of the external apparatus 520 to the server 530, thereby making a request for the authentication. Thus, the authentication is performed in the server 530. The operations subsequent to the authentication are equivalent to those of the embodiment of the disclosure described above.

When it is determined that the user ID is not input through the UI 511, the electronic apparatus 510 ignores the request from the external apparatus 520. This determination may be performed when there are no inputs for a preset period of time after displaying the UI 511, or when a user clicks a cancel button provided in the UI 511.

Further, the electronic apparatus 510 may acquire the user ID from a storage apparatus 540 which is storing the user ID. The electronic apparatus 510 may acquire the user ID from the storage apparatus 540 when receiving the request from the external apparatus 520, and transmit the acquired user ID and the ID of the external apparatus 520 to the server 530.

In the foregoing various embodiments of the disclosure, the electronic apparatus is storing the secure access information. Actually, the electronic apparatus is storing the secure access information to communicate with the host apparatus. When the secure access information is commonly used to have the communication access to the host apparatus, i.e. when any apparatus having the secure access information is capable of accessing the host apparatus, it is no matter whether the electronic apparatus transmits the previously stored secure access information to the external apparatus.

By the way, the electronic apparatus may not be storing the secure access information needed for the external apparatus to access the host apparatus. In this case, the electronic apparatus may receive the secure access information needed for the external apparatus from the host apparatus and then transmit it to the external apparatus. Below, such an embodiment will be described.

Figure 6:
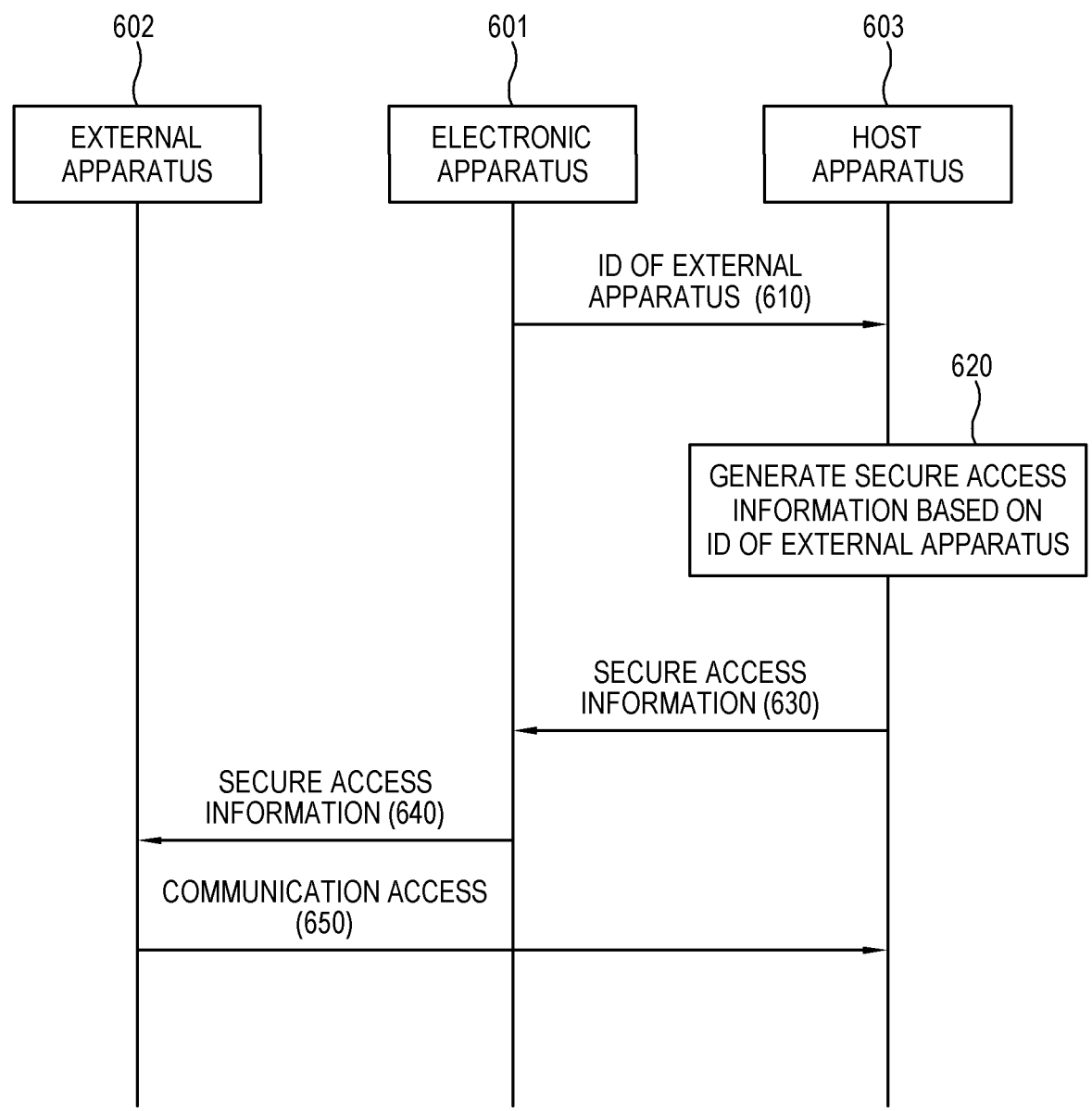
FIG. 6 is a view showing an example of procedures in which an electronic apparatus transmits secure access information in response to a request from an external apparatus according to an embodiment of the disclosure.

FIG. 6 is a view showing an example of procedures in which an electronic apparatus transmits secure access information in response to a request from an external apparatus according to an embodiment of the disclosure.

Referring to FIG. 6, when the electronic apparatus 601 receives a request for having a communication access to a host apparatus 603 from an external apparatus 602, it is determined whether the external apparatus 602 is authorized by authenticating the ID of the external apparatus 602. When the external apparatus 602 is authorized, the electronic apparatus 601 has to transmit the secure access information to the external apparatus 602. These operations are equivalent to those of the foregoing embodiment of the disclosure, and thus repetitive descriptions will be avoided.

By the way, although the electronic apparatus 601 can have a communication access to the host apparatus 603, the secure access information stored in the electronic apparatus 601 may be no use to the external apparatus 602 than is going to have the communication access to the host apparatus 603. For example, the host apparatus 603 may perform communication by assigning a logical address or an index number for identification to each apparatus that belongs to the system. The host apparatus 603 respectively assigns the logical addresses to the apparatuses of the system, and then communicates with each individual apparatus based on the assigned logical address. In other words, the host apparatus 603 may generate pieces of secure access information in accordance with the apparatuses within the system and assign the secure access information to each individual apparatus.

In this case, the secure access information stored in the electronic apparatus 601 is valid for the electronic apparatus 601, but invalid for the external apparatus 602. Therefore, the electronic apparatus 601 transmits the secure access information to the external apparatus 602 by the following procedures.

When the external apparatus 602 is authenticated, at operation 610 the electronic apparatus 601 transmits the ID of the external apparatus 602 to the host apparatus 603.

At operation 620, the host apparatus 603 generates secure access information dedicated for the external apparatus 602 based on the ID of the external apparatus 602. The secure access information dedicated for the external apparatus 602 means that no other apparatuses but the external apparatus 602 can use the secure access information in accessing the host apparatus 603. To this end, the secure access information may have various pieces of content. For example, a certain apparatus may need logical ID, which is valid in the system and given by the host apparatus 603, in order to access the host apparatus 603. The content of the secure access information may be varied depending on various factors such as an operation mode of the host apparatus 603, a communication protocol, a structure of the system, etc. without limitations.

At operation 630, the host apparatus 603 transmits the generated secure access information to the electronic apparatus 601.

At operation 640, the electronic apparatus 601 transmits the secure access information received from the host apparatus 603 to the external apparatus 602. The electronic apparatus 601 may delete the secure access information after transferring the secure access information from the host apparatus 603 to the external apparatus 602.

At operation 650, the external apparatus 602 receives and stores the secure access information from the electronic apparatus 601, and accesses the host apparatus 603 based on the stored secure access information.

Thus, the electronic apparatus 601 according to this embodiment of the disclosure transmits the secure access information acquired from the host apparatus 603 to the external apparatus 602.

In the foregoing various embodiments of the disclosure, the server having the ID DB receives the ID of the external apparatus and the user ID from the electronic apparatus, performs authentication in accordance with whether the ID of the external apparatus matches with the user ID, and transmits a result of authentication to the electronic apparatus. These operations may for example be implemented when the external apparatus purchased by a user from the electronic shopping mall is unboxed and powered on.

By the way, the authentication of the external apparatus may be determined differently from that of the foregoing embodiment of the disclosure. In this regard, descriptions will be made below.

Figure 7:
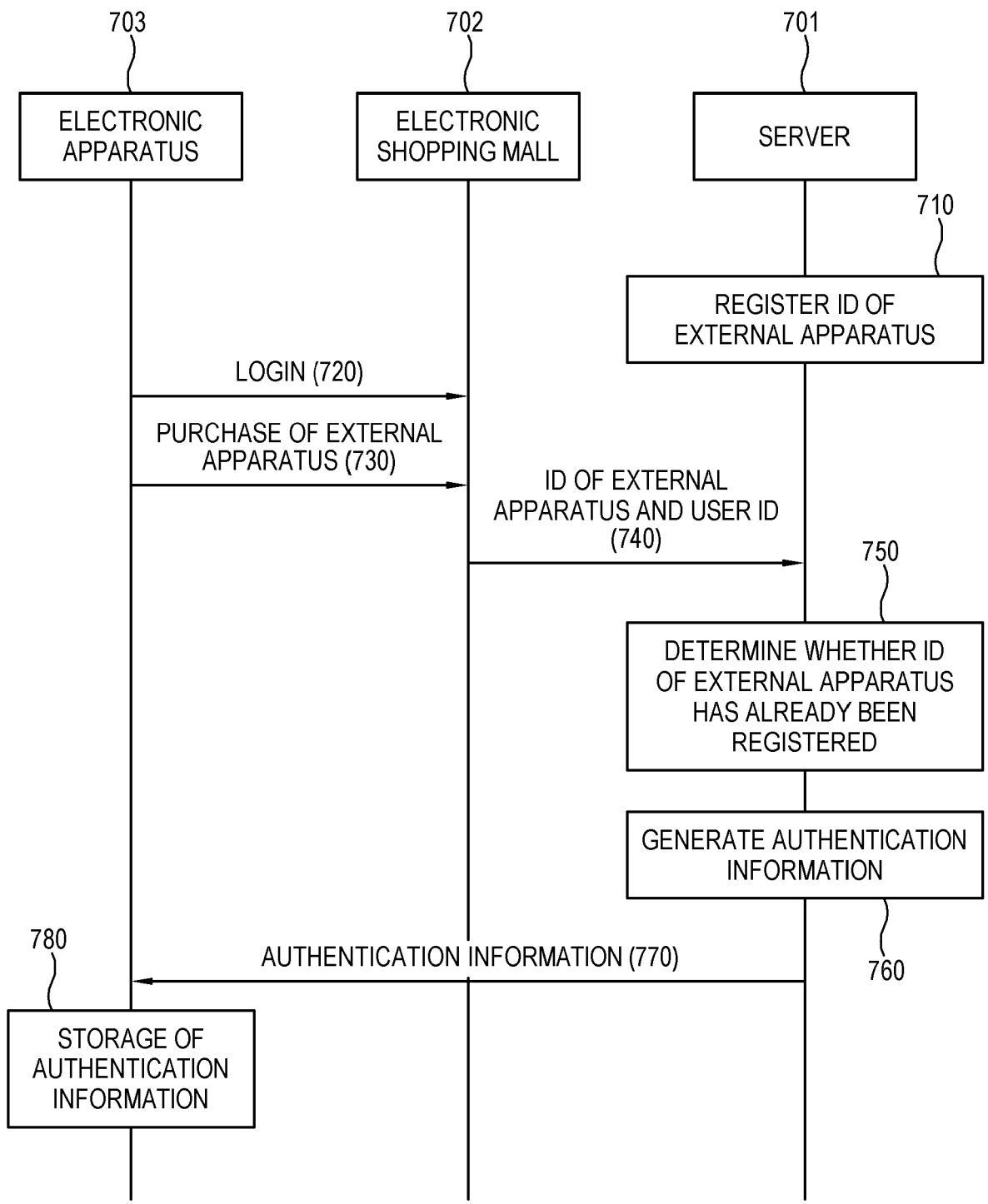
FIG. 7 is a view showing an example of storing authentication information of an external apparatus in an electronic apparatus when a user purchases the external apparatus through the electronic apparatus under a system according to an embodiment of the disclosure.

FIG. 7 is a view showing an example of storing authentication information of an external apparatus in an electronic apparatus when a user purchases the external apparatus through the electronic apparatus under a system according to an embodiment of the disclosure.

Referring to FIG. 7, an electronic shopping environment where a user can make a purchase of an external apparatus includes a server 701 to be managed by a manufacturer of manufacturing an external apparatus, an electronic shopping mall 702 of selling the external apparatus manufactured by the manufacturer, and an electronic apparatus 703 to be controlled by a user to purchase the external apparatus from the electronic shopping mall 702.

At operation 710, the manufacturer registers the ID of the external apparatus to the server 701.

At operation 720, the electronic apparatus 703 logs in with a user ID to the electronic shopping mall 702.

At operation 730, the electronic apparatus 703, to which the user ID is being logged in, purchases the external apparatus from the electronic shopping mall 702.

The electronic shopping mall 702 delivers the external apparatus, which has been purchased by a user through the electronic apparatus 703, to the user. In this case, at operation 740 the electronic shopping mall 702 transmits the ID of the external apparatus and the ID of the user, who has made the purchase of the external apparatus, to the server 701.

At operation 750, the server 701 determines whether the ID of the external apparatus received from the electronic shopping mall 702 has already been registered or not. When it is determined that the ID of the external apparatus has not already been registered, the server 701 take a separate measure of informing the electronic shopping mall 702 that the ID of the external apparatus is invalid.

When it is determined that the ID of the external apparatus has already been registered, at operation 760 the server 701 generates the authentication information based on the ID of the external apparatus and the user ID. The authentication information may be generated in various ways. For example, the authentication information may be generated to just include the ID of the external apparatus and the corresponding user ID as long as there are no security problems of leakage. Taking the security into account, the ID of the external apparatus and the user ID may be converted into binary data in accordance with preset algorithms such as a hash function, or data encrypted in accordance with a public key system.

At operation 770, the server 701 transmits the authentication information to the electronic apparatus 703, or the server 701 transmits the authentication information to the electronic shopping mall 702 so that the electronic shopping mall 702 can transmit the authentication information to the electronic apparatus 703.

At operation 780, the electronic apparatus 703 stores the authentication information received from the server 701. Thus, the electronic apparatus 703 can have the authentication information for authenticating the external apparatus in the stage of purchasing the external apparatus.

Below, it will be described that a user unboxes the purchased external apparatus to be authenticated by the electronic apparatus 703.

Figure 8:
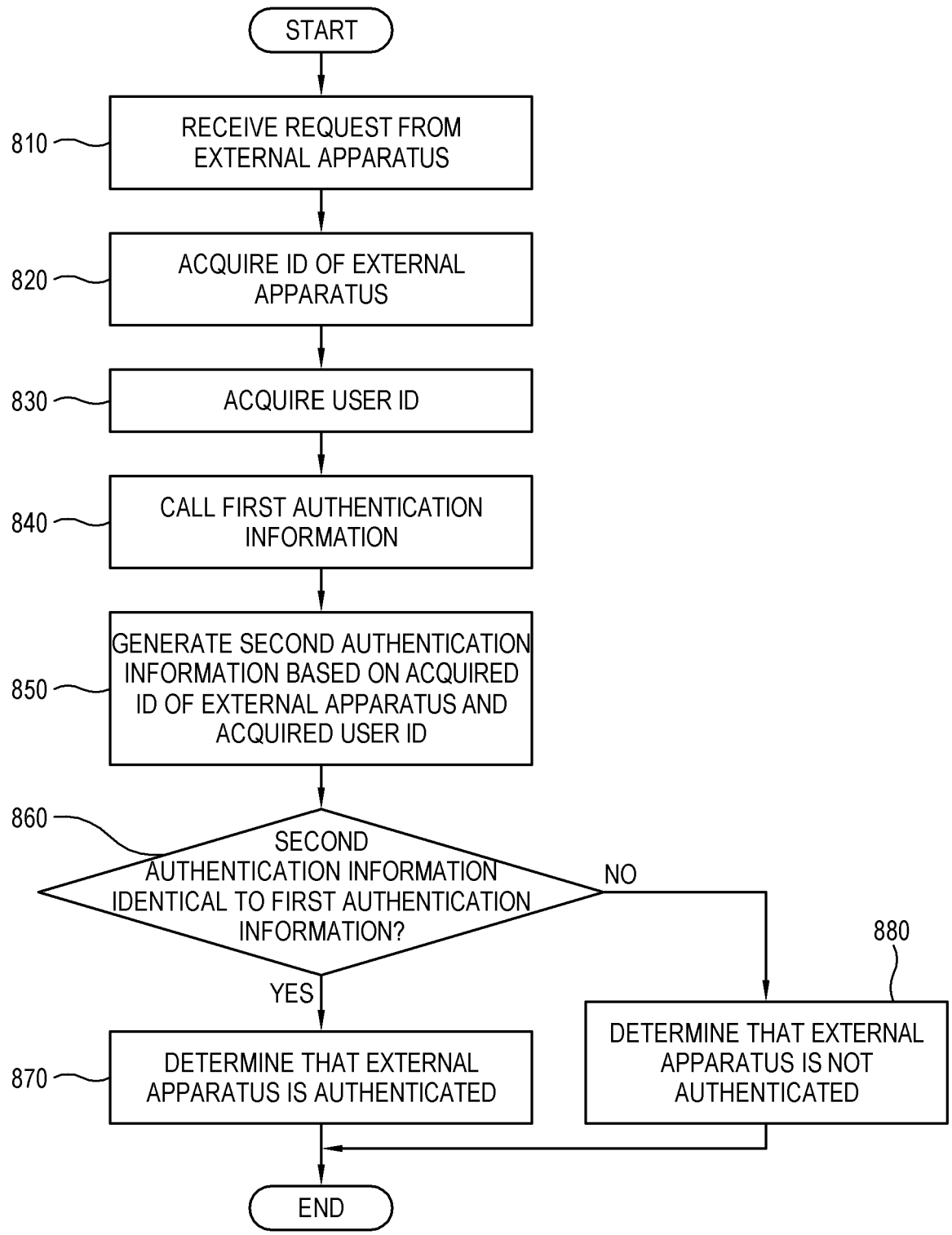
FIG. 8 is a flowchart showing procedures in which an electronic apparatus authenticates an external apparatus in response to a request from the external apparatus according to an embodiment of the disclosure.

FIG. 8 is a flowchart showing procedures in which an electronic apparatus authenticates an external apparatus in response to a request from the external apparatus according to an embodiment of the disclosure.

Referring to FIG. 8, at operation 810, the electronic apparatus receives a request for having a communication access to the host apparatus from the external apparatus. In this embodiment of the disclosure, the electronic apparatus is equivalent to the foregoing electronic apparatus shown in FIG. 7.

At operation 820, the electronic apparatus acquires the ID of the external apparatus from the request received from the external apparatus.

At operation 830, the electronic apparatus acquires the user ID.

At operation 840, the electronic apparatus calls the previously stored first authentication information. The first authentication information refers to the authentication information generated by the server in the foregoing embodiment of the disclosure of FIG. 7.

At operation 850, the electronic apparatus generates second authentication information based on the ID of the external apparatus and the user ID. The second authentication information is generated by the same algorithm as that for the first authentication information.

At operation 860, the electronic apparatus determines whether the second authentication information is identical to the first authentication information. There are many ways of determining whether two pieces of authentication information are identical with each other, in accordance with how the authentication information is generated. For example, when the first authentication information just includes the ID of the external apparatus and the user ID, the electronic apparatus compares the ID of the external apparatus acquired in the operation 820 and the user ID acquired in the operation 830 with the ID of the external apparatus and the user ID acquired in the first authentication information, respectively. When the first authentication information is provided as a hash code, the electronic apparatus converts the acquired ID of the external apparatus and the acquired user ID into a hash code, and then compares the converted hash code with the first authentication information. When the first authentication information is provided as encrypted data, the electronic apparatus decrypts the first authentication information with a secret key and compares the decrypted first authentication information with the second authentication information.

When it is determined that the second authentication information is identical to the first authentication information, at operation 870 the electronic apparatus determines that the external apparatus is authenticated. Then, the electronic apparatus transmits the secure access information to the external apparatus as described in the foregoing embodiment of the disclosure.

On the other hand, when it is determined that the second authentication information is not identical to the first authentication information, at operation 880 the electronic apparatus determines that the authentication of the external apparatus is failed. Thus, the electronic apparatus ignores the request from the external apparatus.

Thus, the electronic apparatus acquires and stores the authentication information in the stage of purchasing the external apparatus, and authenticates the external apparatus without accessing the server in the next stage of authenticating the external apparatus.

Below, hardware elements of the electronic apparatus, the external apparatus, the host apparatus and the server will be described.

Figure 9:
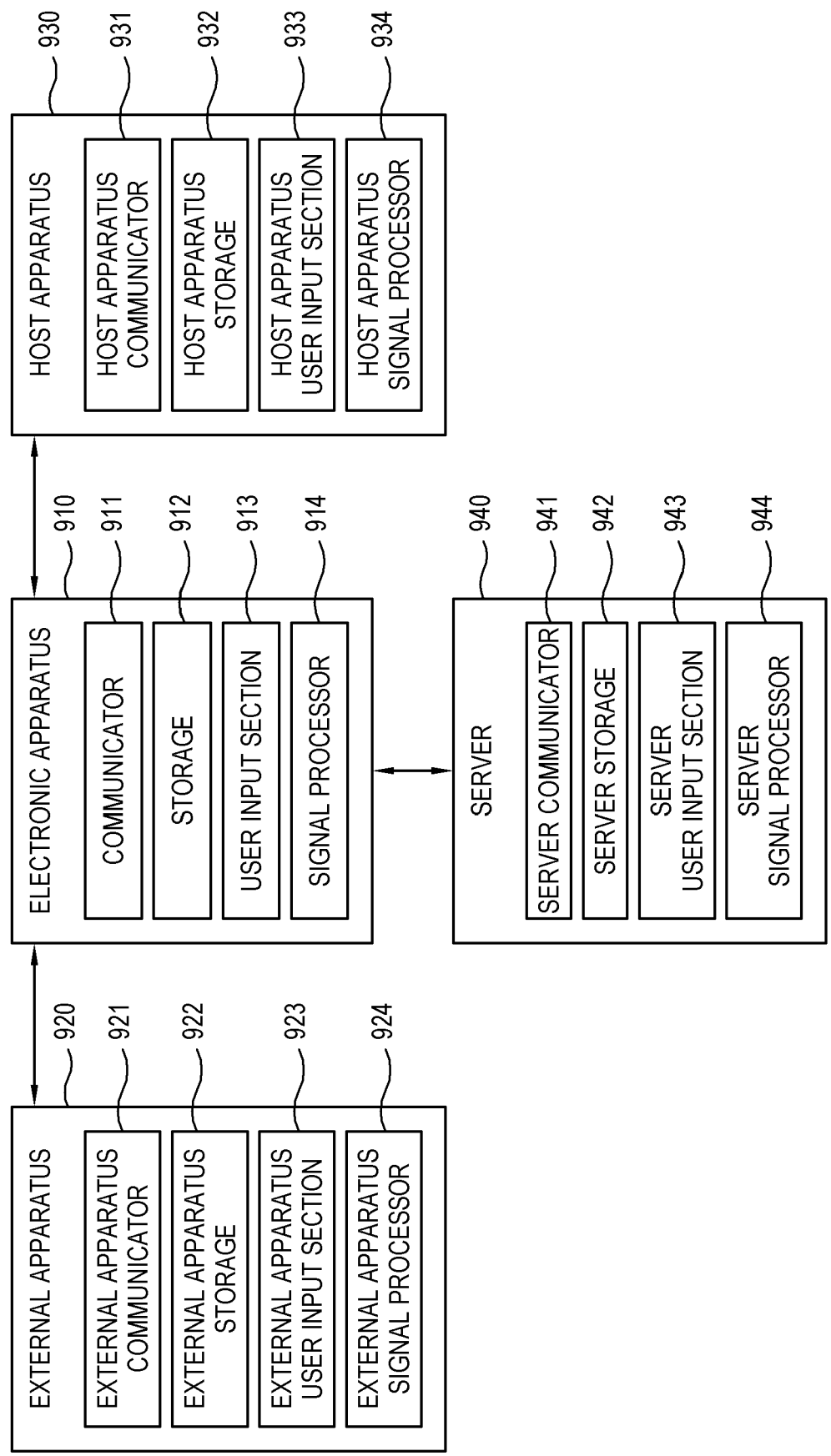
FIG. 9 is a block diagram of apparatuses according to an embodiment of the disclosure.

FIG. 9 is a block diagram of apparatuses according to an embodiment of the disclosure.

Referring to FIG. 9, there are provided an electronic apparatus 910, an external apparatus 920, a host apparatus 930 and a server 940. The electronic apparatus 910 includes a communicator 911 for performing communication, a storage 912 for storing data, a user input section 913 for receiving a user's input, and a signal processor 914 for processing data. When the electronic apparatus 910 is materialized by the display apparatus, the electronic apparatus 910 further includes a display for displaying an image.

The communicator 911 includes a communication chip or the like communication circuit. The communicator 911 supports a plurality of wired or wireless communication protocols, and at least has a communication access to each of the external apparatus 920 and the host apparatus 930. The communicator 911 may support communication protocols such as USB, Bluetooth, Wi-Fi, Wi-Fi direct, ZigBee, etc.

The storage 912 performs reading, writing, modifying, deleting, updating, etc. to data under control of the signal processor 914. The storage 912 includes a flash memory, a hard disc drive, a solid state drive or the like nonvolatile memory capable of retaining data regardless of whether the system of the electronic apparatus 910 is powered on or off; and a buffer, a random access memory (RAM) and the like volatile memory in which data to be processed by the signal processor 914 is temporarily loaded.

The user input section 913 transmits various preset control commands or information to the signal processor 914 in response to a user's control or input. In other words, the user input section 913 outputs various events generated in accordance with a user's intention, so that the signal processor 914 can operate in response to the corresponding event. The user input section 913 may be variously materialized as a menu key, a touch pad, a touch screen, a remote controller, etc.

The signal processor 914 performs preset processes with regard to an electric signal or packet data, thereby processing the electric signal or the packet data. The processes performed in the signal processor 914 are varied depending on the types of the electronic apparatus 910 without limitations. For example, when the electronic apparatus 910 is a TV, the signal processor 914 basically performs a broadcast image processing process with regard to a tuned broadcast signal. The signal processor 914 may include a hardware processor, a CPU or the like materialized by a chipset, a circuit, a buffer, etc. mounted on to a printed circuit board, or materialized by a system on chip (SoC) in accordance with designs.

By the way, the external apparatus 920 may include an external apparatus communicator 921, an external apparatus storage 922, an external apparatus user input section 923, and an external apparatus signal processor 924.

The host apparatus 930 may include a host apparatus communicator 931, a host apparatus storage 932, a host apparatus user input section 933, and a host apparatus signal processor 934.

The server 940 may include a server communicator 941, a server storage 942, a server user input section 943, and a server signal processor 944.

Basic features of the elements included in the external apparatus 920, the host apparatus 930 and the server 940 are equivalent to those of the electronic apparatus 910, and repetitive descriptions thereof will be avoided. The operations of the external apparatus 920, the host apparatus 930, and the server 940 are also equivalent to those as described in the above various embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
    a storage configured to store secure access information to communicate with a host apparatus;
    a communicator configured to communicate with the host apparatus using the secure access information based on a first communication standard or communicate with an external apparatus based on a second communication standard;
    a display; and
    a processor configured to:
        receive a request including an ID of the external apparatus from the external apparatus through the communicator based on the second communication standard, the request for having communicating access to the host apparatus based on the first communication standard,
        display a user interface (UI) for receiving an input of a user ID in response to the request,
        acquire the user ID of the electronic apparatus based on the input to the UI,
        communicate to a server through the host apparatus based on the first communication standard and log in the server with the user ID,
        transmit the ID of the external apparatus to the server in which the user ID is logged,
        in response to being identified by the server that the ID of the external apparatus corresponds to the user ID, transmit the secure access information stored in the storage, through the communicator based on the second communication standard, such that the external apparatus communicates with the host apparatus based on the first communication standard, and
        in response to being identified by the server that the ID of the external apparatus does not correspond to the user ID, not transmit the secure access information to the external apparatus.

2. The electronic apparatus according to claim 1, wherein the processor is further configured to:
    access a database in which an ID of a user is stored corresponding to IDs of one or more external apparatuses, and
    identify that the ID of the external apparatus corresponds to the user ID when the ID of the external apparatus matching with the user ID of the electronic apparatus is retrieved in the database.

3. The electronic apparatus according to claim 2, wherein the database is stored in the server.

4. The electronic apparatus according to claim 3, wherein the storage is further configured to store the user ID, and
    wherein the processor is further configured to transmit the user ID of the electronic apparatus stored in the storage.

5. The electronic apparatus according to claim 2, wherein the storage is further configured to store the database, and
    wherein the processor is further configured to identify whether the ID of the external apparatus corresponds to the user ID in accordance with retrieval results from the database stored in the storage.

6. The electronic apparatus according to claim 1, wherein the secure access information comprises at least one of network information and password information set in the host apparatus to provide access to the host apparatus.

7. The electronic apparatus according to claim 1, wherein the processor is further configured to:
    call previously generated first authentication information based on the ID of the external apparatus and a user ID used in purchasing the external apparatus,
    generate second authentication information based on the ID of the external apparatus acquired from the request and the user ID of the electronic apparatus acquired in response to the request, and
    identify that the ID of the external apparatus corresponds to the user ID when the second authentication information is identical to the first authentication information.

8. A method of controlling an electronic apparatus, the method comprising:
    communicating with a host apparatus using secure access information based on a first communication standard;
    receiving a request from an external apparatus based on a second communication standard, wherein the request is for communicating access to the host apparatus based on the first communication standard and includes an ID of the external apparatus;
    displaying a user interface (UI) for receiving an input of a user ID in response to the request,
    acquiring the user ID of the electronic apparatus based on the input to the UI;
    communicating to a server through the host apparatus based on the first communication standard and log in the server with the user ID;
    transmitting the ID of the external apparatus to the server in which the user ID is logged;
    in response to being identified by the server that the ID of the external apparatus corresponds to the user ID, transmitting the secure access information based on the second communication standard, such that the external apparatus communicates with the host apparatus based on the first communication standard; and
    in response to being identified by the server that the ID of the external apparatus does not correspond to the user ID, not transmitting the secure access information to the external apparatus.

9. The method according to claim 8, further comprising:

accessing a database in which an ID of a user is stored corresponding to IDs of one or more external apparatuses; and identifying that the ID of the external apparatus corresponds to the user ID when the ID of the external apparatus matching with the user ID of the electronic apparatus is retrieved in the database.

10. The method according to claim 9, wherein the database is stored in the server.

11. The method according to claim 10, further comprising:

transmitting the user ID of the electronic apparatus stored in the electronic apparatus.

12. The method according to claim 9, further comprising:

identifying whether the ID of the external apparatus corresponds to the user ID in accordance with retrieval results from the database stored in the electronic apparatus.

13. The method according to claim 8, wherein the secure access information comprises at least one of network information or password information set in the host apparatus to provide access to the host apparatus.

14. The method according to claim 8, further comprising:

calling previously generated first authentication information based on the ID of the external apparatus and a user ID used in purchasing the external apparatus;

generating second authentication information based on the ID of the external apparatus acquired from the request and the user ID of the electronic apparatus acquired in response to the request; and identifying that the ID of the external apparatus corresponds to the user ID when the second authentication information is identical to the first authentication information.

15. A system comprising:

a host apparatus; and an electronic apparatus, the electronic apparatus comprising:

a storage configured to store secure access information to communicate with the host apparatus;

a communicator configured to communicate with the host apparatus using the secure access information based on a first communication standard or communicate with an external apparatus based on a second communication standard; and a processor configured to:

receive a request including an ID of the external apparatus from the external apparatus through the communicator based on the second communication standard, the request for having communicating access to the host apparatus based on the first communication standard, display a user interface (UI) for receiving an input of a user ID in response to the request, acquire the user ID of the electronic apparatus based on the input to the UI, communicate to a server through the host apparatus based on the first communication standard and log in the server with the user ID, transmit the ID of the external apparatus to the server in which the user ID is logged, in response to being identified by the server that the ID of the external apparatus corresponds to the user ID, transmit the secure access information stored in the storage, through the communicator based on the second communication standard, such that the external apparatus communicates with the host apparatus based on the first communication standard, and in response to being identified by the server that the ID of the external apparatus does not correspond to the user ID, not transmit the secure access information to the external apparatus.

* * * * *